Patented May 14, 1940

2,200,726

UNITED STATES PATENT OFFICE 2,200,726

BUFFING COMPOUND

Eldridge E. Seeley, Fairfield, Conn.

No Drawing. Application May 20, 1939,
Serial No. 274,711

8 Claims. (Cl. 51—300)

This invention relates to buffing compounds for polishing metals, plastics and the like and has for its particular objects the provision of a product of that character which is cheap to manufacture, highly efficient, unusually stable on storage under varying temperature conditions, is essentially greaseless and which is free from readily volatile liquids, thereby admitting of it being stored in open containers for days at a time without objectionable thickening or deterioration. Still other advantages of the product comprise the provision of a buffing compound which can be used as the final step in polishing operations without necessitating any subsequent washing and drying operations.

I am aware that it has been proposed to employ as binders in abrasive compositions used for buffing purposes aqueous solutions of various glues but such solutions when exposed to the air thicken objectionably and otherwise deteriorate in use due to the evaporation of the aqueous vehicle at the temperatures generated in the buffing operation and therefore such products must, of necessity, be consumed promptly when the container in which they are stored is opened, which features, in many plants and shops, constitute a serious objection.

My investigations have led to the discovery that ordinary shellac or so-called lac is ideally suited for use in the production of essentially anhydrous buffing compounds, the same being remarkably stable and readily soluble in non-aqueous, non-volatile solvents, thus dispensing with the necessity for the employment of water as a solvent therefor, with the consequence that upon exposure of such buffing compounds to the atmosphere there is little if any resultant thickening or setting of the same even on prolonged exposure in an open receptacle or any objectionable deterioration thereof during the buffing operation.

The following examples are illustrative of my invention:

Formula #1

| | Per cent |
|---|---|
| Shellac | 9 |
| Rosin | 3 |
| Diethylene glycol | 6 |
| Abrasive (200 mesh silica for example) | 82 |
| | 100 |

Formula #2

| | Per cent |
|---|---|
| Shellac | 9 |
| Stearic acid | 3 |
| Diethylene glycol methyl ether | 6 |
| Abrasive (fine emery powder) | 82 |
| | 100 |

In compounding the aforesaid buffing compound in accordance with Formula #1, the shellac and rosin, or the shellac and stearic acid are first dissolved in the particular glycol compound employed, preferably while heating the same to 180° F., and the abrasive is then stirred thereinto and intimately incorporated therewith in the well known manner. The mixtures prepared in accordance with either of the foregoing formulae are poured into molds and when solidified are then packaged in suitable containers.

The glycol compound serves to maintain the shellac in permanent solution in the container in which the same is stored but though substantially non-volatile, the same is entrained by the fanning action of the air during the preliminary rotation of the buffing wheel even prior to the actual buffing operation, with the result that the buffing compound substantially solidifies on the buffing wheel and becomes effectively retained thereby.

The shellac and rosin and the shellac and stearic acid in the above formulae constitute the binders of my improved buffing compounds, such binders in the quantities used being essentially greaseless, since the same solidify during the preliminary rotation of the buffing wheel to a uniform, friable film or coating which is easily pulverized and removed by the buffing wheel, thus leaving the work essentially free from any grease-like film when the operation is completed and hence no final washing and drying operations are required to complete the finish of work which has been buffed with such compounds in order to properly prepare the same for subsequent lacquering, plating or other finishing operations.

While I preferably employ rosin as an ingredient in the composition specified in Formula #1, other resins such as manila or copal may also be employed either in admixture with rosin or in lieu thereof.

In lieu of diethylene glycol or diethylene glycol methyl ether, or as a partial substitute therefor, I may also employ other glycol compounds, such for example as diethylene butyl-or-propyl-ether, in the manufacture of such buffing compounds.

Obviously various finely powdered abrasives, as rouge, emery, levigated alumina and the like such as commonly used in buffing compounds, may be substituted for the silica or Vienna lime hereinbefore specified.

By the term "lac" which is used herein in a generic sense, I refer to shellac, a well known resinous substance exuded from East Indian scale insects and the plants infested therewith and similar exudations caused by other scale insects on plants and trees besides generally other resinous, alcohol-soluble lacs of the order of shellac, whether obtained from the sap of plants or trees or made synthetically.

My improved buffing compound which is preferably molded in the form of a cylindrical rod, is employed in the usual manner by causing the same to frictionally engage the rotating buffing wheel, which latter is usually composed of a plurality of cloth discs, and then the wheel after the same has received the desired quantity of the buffing compound is rotated to permit of the setting of the deposited compound on the buffing wheel by the fanning action of the air, as aforesaid, and then the rotating buffing wheel is caused to engage the work to be finished whether metal, plastic or the like.

Due to its greaseless nature of my improved buffing compound, it is peculiarly efficient insofar as the abrasive properties thereof are concerned and also insofar as the number of rejects are concerned, owing to the fact that the operative can at all times observe the finish imparted to the work because, as aforesaid, no grease-like coating is deposited thereon.

Various changes in the composition and the method making the same from that above described and within the scope of the appended claims may be made without departing from the spirit of my invention.

Having thus described my invention, what I claim is:

1. An abrasive compound, comprising a resinous alcohol-soluble lac of the order of shellac, a relatively non-aqueous solvent therefor, a resin which is oil soluble, and a major percentage of abrasive material.

2. An abrasive compound, containing a small percentage of a resinous alcohol-soluble lac of the order of shellac, a non-volatile, substantially non-aqueous solvent therefor and a major percentage of abrasive material.

3. An abrasive compound, comprising shellac, diethylene glycol, rosin and a major percentage of abrasive material.

4. An abrasive compound, comprising shellac, stearic acid, and diethylene glycol and containing a major percentage of a finely divided abrasive.

5. An abrasive compound, comprising shellac, rosin, diethylene glycol and a finely pulverized abrasive, the shellac being present in an amount substantially in excess of the said glycol, the amount of rosin being substantially less than the amount of glycol and the abrasive constituting the principal ingredient of the compound.

6. An abrasive compound, comprising shellac, stearic acid, and a member of a group consisting of diethylene glycol and ether compounds thereof admixed with a major percentage of a finely divided abrasive.

7. An abrasive compound, containing an alcohol soluble, a resinous alcohol-soluble lac of the order of shellac, a member of a group consisting of diethylene glycol and ether compounds thereof and a relatively large percentage, not less than 50% by weight of the compound, of a finely divided abrasive.

8. An abrasive buffing compound, consisting principally of a finely divided abrasive intimately admixed with an alcohol-soluble, a resinous alcohol-soluble lac of the order of shellac and a non-aqueous, substantially non-volatile solvent therefor.

ELDRIDGE E. SEELEY.